Aug. 18, 1964   E. S. STORK ETAL   3,144,822
SYMBOL PRINTING CONTROL FOR ACCOUNTING MACHINES
Filed Oct. 19, 1960   3 Sheets-Sheet 1

INVENTORS
EDWARD S. STORK
WALTER J. STARK
BY *Louis A. Kline*
*Albert L. Sessler, Jr.*
THEIR ATTORNEYS

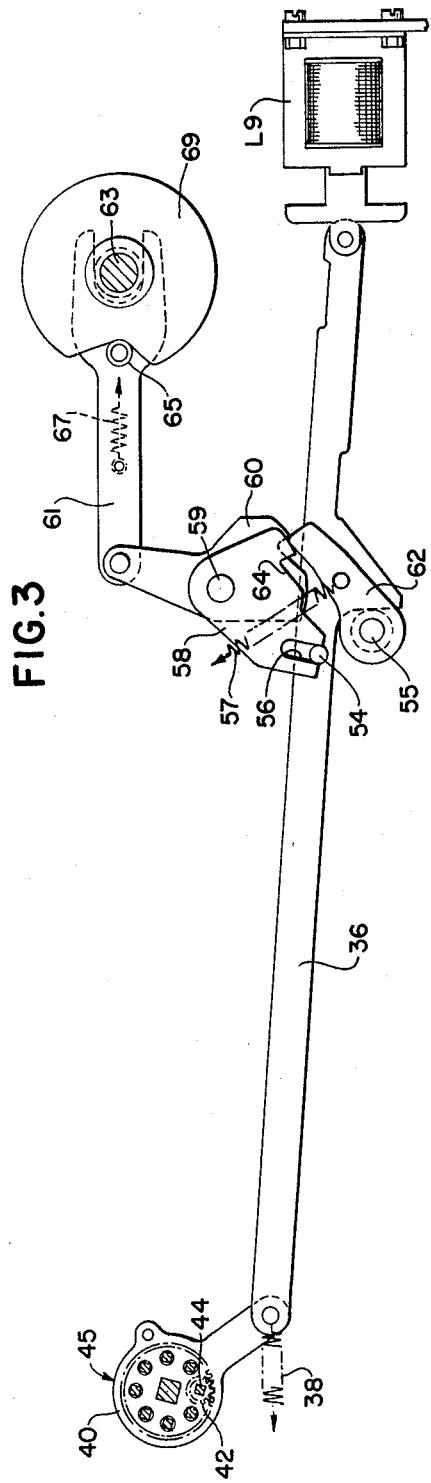
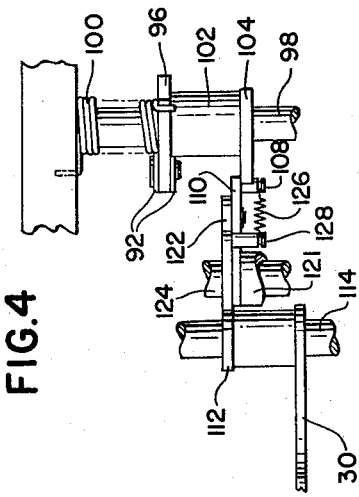

United States Patent Office 3,144,822
Patented Aug. 18, 1964

3,144,822
SYMBOL PRINTING CONTROL FOR
ACCOUNTING MACHINES
Edward S. Stork and Walter J. Stark, Dayton, Ohio, assignors to The National Cash Register Company, Dayton, Ohio, a corporation of Maryland
Filed Oct. 19, 1960, Ser. No. 63,644
2 Claims. (Cl. 101—93)

This invention relates generally to accounting machines which operate in conjunction with a magnetically coded ledger card to enable the picking up of an old balance and other information from the ledger card and the subsequent recording of the new balance and other information on the ledger card at the end of an accounting transaction. In particular, the invention relates to such a machine in which the picking up of a balance must sometimes be accomplished by manual entry means, and in which automatic controls are provided for printing a symbol on the ledger card to indicate when the entry of balance information is manual rather than automatic.

The present invention is well adapted for use with an accounting machine of the type disclosed in the United States Patent No. 2,947,475, issued August 2, 1960, to Konrad Rauch et al., inventors, but is not limited to use with such a machine.

This particular feature of printing of a symbol to identify a manually-entered balance has been found to be desirable due to the fact that it provides one means of isolating a possible error, when incorrect totals or other information are provided by the machine. It is much more likely that an operator will make an erroneous manual entry of balance information than that the machine will make an erroneous entry. Therefore, identification of manual balance entries is of considerable aid in finding errors.

The printing of a special symbol to indicate a manually-entered balance is accomplished in the present invention by the use of control mechanisms which are actuated during the initiation of certain types of machine operations. A first control mechanism is operated by a solenoid when a manual input or card remake operation of the machine is initiated, and a second control mechanism is operated by a mechanical linkage incident to the initiation of a new balance operation of the machine. Further means are provided to sense the first and second control mechanisms, and set the printing means accordingly, to print the appropriate symbol during the new balance operation.

Accordingly, it is an object of the present invention to provide an accounting machine having control means for causing the automatic printing of a first symbol in association with the printing of the next new balance when information has been previously picked up automatically from a ledger card, and for causing the printing of a second symbol in association with the printing of the next new balance when information has been previously entered manually by the machine operator.

Another object is to provide an accounting machine having a printing control mechanism which is operated at the time of a new balance operation to print a symbol indicating whether the previous pickup of the balance information has been automatic or manual.

With these and other objects, which will become apparent from the following description, in view, the invention includes certain novel features of construction and combinations of parts, a preferred form or embodiment of which is hereinafter described with reference to the drawings which accompany and form a part of this specification.

In the drawings:

FIG. 3 is a fragmentary detail view showing solenoid-operated means for controlling a second print selection plate, which cooperates with the print selection plate shown in FIG. 2 to determine the symbol to be printed.

FIG. 4 is a plan view showing a portion of the mechanism shown in FIG. 1.

Figure 1:
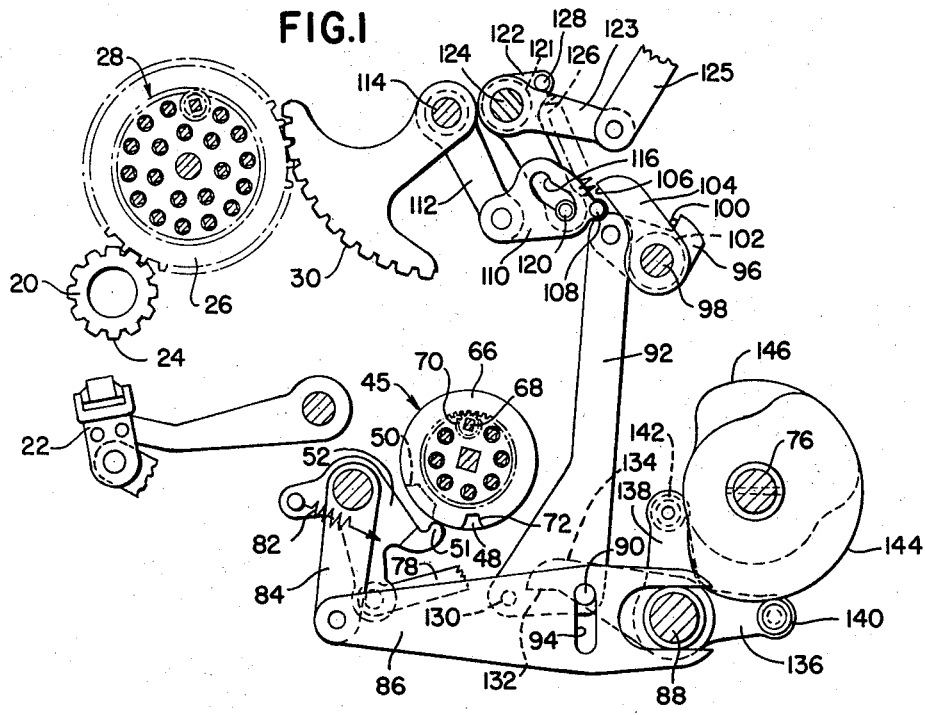
FIG. 1 is a fragmentary detail view showing a type wheel and a cooperating impression hammer for printing symbols on a ledger card, and also showing mechanism for controlling the positioning of the type wheel to determine which symbol is to be printed.

Referring now to FIG. 1 of the drawings, shown therein are a rotatably-mounted type wheel 20 and a cooperating impression hammer 22. The manner in which the impression hammer 22 is caused to operate whenever a printing impression is desired is fully described in the previously-mentioned United States patent, No. 2,947,475. The type wheel 20 is set to position a desired character face 24 on said type wheel in printing position opposite the impression hammer 22 by means of a gear 26, which forms part of an internal gear drive unit shown generally at 28, of the type shown and described in the United States patent to Walter J. Kreider, No. 1,693,279, issued November 27, 1928. This unit functions to set various type wheels in the accounting machine for printing of amounts and symbols relating to the particular operations being performed by the accounting machine. The gear 26 is positioned by a segment 30, which in turn is controlled by the control row 1 of the keyboard of the accounting machine, in a manner which is fully described in the previously-mentioned United States Patent No. 2,947,475. This positioning is such that, during a new balance operation following a normal automatic pickup of an old balance from the ledger card, an appropriate symbol, such as an asterisk, is printed on the same line as the new balance on a ledger card 21, as shown in FIG. 5, where the reference character 23 is applied to the asterisk symbol.

Figures 5, 6:
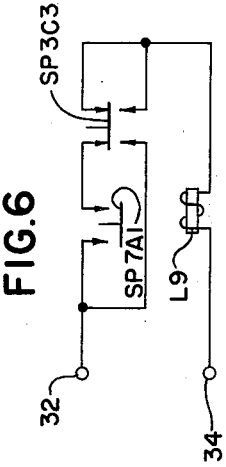
FIG. 5 shows a portion of a ledger card on which both automatic and manual balance pickups have been indicated by the printing of an appropriate symbol in association with the following new balance operations.
FIG. 6 is a circuit diagram showing an energizing circuit for the manual input solenoid.

In addition, means are provided to shift the segment 30, and through it the gear 26 and the type wheel 20, to a further position, in the situation in which the entry of the preceding old balance was a manual operation by the machine operator, so that a different symbol, such as a triangle, is printed in place of the asterisk, as shown in FIG. 5, where the reference character 25 is applied to the triangle symbol.

The above means include a solenoid L9 (FIGS. 3 and 6), which is energized whenever a manual input or remake operation is initiated, by means of a circuit shown in FIG. 6. This circuit is included in the operating circuitry of the machine, the conventional portion of which is shown in the previously-mentioned United States Patent No. 2,947,475. As shown in FIG. 6, the circuit extends between two terminals 32 and 34, to which is applied a source which typically may be of 110 volts, 60 cycle A.C. power. Included in series with the solenoid L9 is a combination of contacts SP3C3 and SP7A1, controlled by the remake key (not shown) and the manual input key (not shown) of the accounting machine.

It will be seen that when both sets of contacts SP3C3 and SP7A1 are in the condition shown, the circuit of FIG. 6 is not completed, and the solenoid L9 is accordingly not energized. However, when either or both of the contacts SP3C3 and SP7A1 are shifted to their alternate positions, the circuit of FIG. 6 is completed, and the solenoid L9 is energized.

As shown in FIG. 3, the actuator of the solenoid L9 is pivotally connected to the right end of a link 36, which is pivotally connected at its other end to an arm on an element 40 on a second internal drive gear unit 45. The link 36 is urged to the left by a spring 38, which is connected between the left end of the link 36 and the machine framework. The element 40 is provided with a circular opening having therein internal gear teeth which mesh with a pinion 42 fixed on a square shaft 44. A second pinion, 46 (FIG. 2), is also fixed on the shaft 44 and meshes with internal teeth on a print selection plate 48 having a low spot 50 on its periphery.

Intermediate the ends of the link 36 is a stud 54, which is arranged to coact with a slot 56 in a retaining plate 58, rotatably mounted on a stud 59 fixed in the machine framework. A control plate 60 is also rotatably mounted on the stud 59 and includes an arm which is pivotally connected to a pitman 61, said pitman bifurcated at its other end for sliding support on an auxiliary cam shaft 63. A spring 67, connected to the pitman 61 and to the machine framework, urges the pitman 61 to the right, as viewed in FIG. 3, so that a roller 65 on said pitman engages the periphery of a cam 69 fixed on the cam shaft 63. A recess 64 is provided in the retaining plate 58 and cooperates with a retaining pawl 62, pivotally mounted on a stud 55 in the machine framework and urged counter-clockwise by a spring 57, to retain the link 36, the element 40, and the plate 58 in a shifted position, at certain times.

An additional print selection plate 66 (FIG. 1) is provided, in association with the print selection plate 48, to control the printing of symbols in connection with the printing of new balances. The positioning of the plate 66 is controlled by the setting of row 1 of the accounting machine keyboard, according to the type of operation which the machine is to perform, in a conventional manner, through a square shaft 68 and a pinion 70 in the internal gear drive unit 45, to set the plate 66 accordingly.

Figure 2:
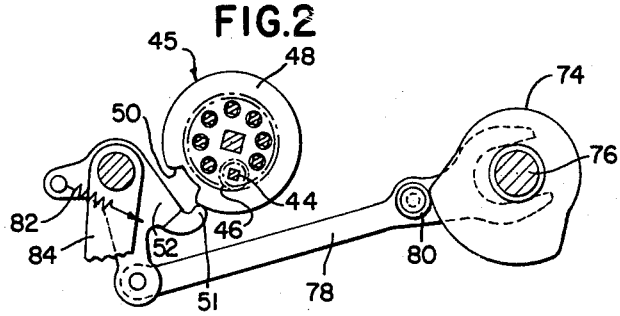
FIG. 2 is a fragmentary detail view showing a print selection plate and cooperating sensing mechanism which is controlled by the plate to determine the symbol to be printed.

As shown in FIGS. 1 and 2, a selecting pawl arm 52, having a feeler 51 thereon, is provided in association with the print selection plates 48 and 66 for sensing high and low surfaces on the peripheries thereof, and is of sufficient width to sense the peripheries of both of said plates simultaneously. The sensing movement of the selecting pawl arm 52 takes place at a selected time during the cycle of accounting machine operation, and is controlled by a feeler cam 74, which is fixed on a printer cam shaft 76 of the accounting machine. Pivotally connected at one end to the selecting pawl arm 52 is a pitman 78, which is bifurcated at its other end for sliding support on the shaft 76, and which is provided intermediate its two ends with a roller 80, which cooperates with the periphery of the cam 74. A spring 82 urges the selecting pawl arm 52 counter-clockwise, as viewed in FIG. 2, and consequently urges the pitman 78 to the right, so that the roller 80 is maintained in engagement with the periphery of the cam 74.

Energization of the solenoid L9 shifts the link 36 to the right, as viewed in FIG. 3, against the force of the spring 38, thereby rocking the element 40 counter-clockwise. This motion is transmitted by means of the pinion 42, the shaft 44, and the pinion 46 to set the plate 48 so that the low spot 50 thereon is positioned in the path of the feeler 51 on the selecting pawl arm 52.

Movement of the link 36 to the right is also effective to shift the retaining plate 58 so that the retaining pawl 62 moves into the recess 64 in the plate 58 and thus retains the link 36, the arm 40, and the plate 58 in the position to which they have been shifted by energization of the solenoid L9, which is subsequently deenergized.

Energization of the solenoid L9 takes place, in the manner previously described, prior to a pickup cycle of operation of the accounting machine, and the coaction of the pawl 62 with the plate 58 is effective to retain the link 36, the element 40, and the plate 58 in their shifted positions through the completion of the pickup cycle of operation, and also through any item entry operations which may follow the pickup operation, as well as the new balance cycle of accounting machine operation which follows the item entry operations. Initiation of a new balance operation causes the print selection plate 66 (FIG. 1) to be positioned so that a low spot 72 is located opposite the feeler 51 on the selecting pawl arm 52.

From approximately 100 degrees to 120 degrees of rotation of the printer cam shaft 76 during a cycle of accounting machine operation, the cam 74 is rotated so that the pitman 78 is free to move to the right, as shown in FIG. 2, under the influence of the spring 82 on the selecting pawl arm 52. This enables the selecting pawl arm 52 to sense for low spots in the plates 48 and 66. In the event that both of the low spots 50 and 72 of the plates 48 and 66 are positioned opposite the feeler 51 on the selecting pawl arm 52, as is the case in a new balance operation following a manual balance pickup operation, the pawl arm 52 moves counter-clockwise, as viewed in FIG. 2, under the influence of the spring 82, and partakes of a full sensing movement.

In the event that the preceding balance pickup was an automatic operation, rather than a manual operation, the solenoid L9 has not been energized, and the low spot 50 on the plate 48 accordingly is not positioned opposite the feeler 51 on the pawl arm 52. A full sensing movement of the pawl arm 52 is thus prevented from taking place.

Fixed for unitary movement with the pawl arm 52 is a second arm 84 (FIGS. 1 and 2), which is pivotally connected at its free end to a pitman 86. The pitman 86 is bifurcated at its free end and is slidably supported on a shaft 88. A stud 90, fixed in the lower end of a link 92, rides in a slot 94 in the pitman 86. The link 92 is pivotally secured, at its other end, to an arm 96 on a shaft 98 (FIGS. 1 and 4), fixed in the machine framework. A spring 100, coiled about the shaft 98 and connected at its ends to the machine framework and to the arm 96, is effective to maintain said arm normally in the position in which it is shown in FIG. 1.

Also mounted on the shaft 98, and fixed to the arm 96 by a sleeve 102 for unitary movement with said arm, is a further arm 104, having thereon a surface 106 adapted to engage a stud 108 on one end of a type wheel segment link 110. At its other end, the link 110 is pivotally connected to an arm 112, rotatably mounted on a shaft 114 and fixed to the segment 30 for unitary movement therewith. A slot 116 in the link 110 accommodates a stud 120, which is fixed in the lower end of an arm 122, mounted on a shaft 124. A spring 126 is connected at one end to a stud 128 on the arm 122 and is connected at its other end to the stud 108 on the link 110. The arm 122 is rigidly connected by a sleeve 121 to an arm 123, which is pivotally connected to one end of a link 125. The other end of the link 125 is connected to the total plate of row 1. The row 1 differential mechanism, including said total plate, is not shown herein, but, for a description of this mechanism, reference may be had to the United States Patent No. 1,619,796, issued March 1, 1927, to Bernis M. Shipley, and to the United States Patent No. 2,373,510, issued April 10, 1945, to Pascal Spurlino et al.

In the lower end of the link 92 is fixed a stud 130, which is positioned to be engaged, at certain times, by a surface 132 on an arm 134 rotatably mounted on the shaft 88 and fixed to move in unison with two additional arms 136 and 138. The arms 136 and 138 have rollers 140 and 142, respectively, fixed thereon, which rollers are adapted to cooperate with the peripheries of a pair of cams 144 and 146, respectively, fixed on the printer cam shaft 76.

When the selecting pawl arm 52 is permitted to make a full counter-clockwise sensing movement, as viewed in FIG. 1, by the positioning of low spots 50 and 72 in the print selection plates 48 and 66, respectively, opposite the feeler 51 on the arm 52, the pitman 86 moves to the right, as viewed in FIG. 1, under the influence of the spring 82. Due to the coaction of the stud 90 with the slot 94, the lower end of the link 92 is carried to the right with the pitman 86, positioning the stud 130 in the link 92 beneath the surface 132 of the arm 134.

From approximately 135 degrees to 170 degrees of rotation of the printer cam shaft 76, the cams 144 and 146 coact with the rollers 140 and 142 to cause the arm 134 to be shifted counter-clockwise, as viewed in FIG. 1. The surface 132 on said arm accordingly engages the stud 130 in the link 92 and shifts said link downwardly.

The downward movement of the link is transmitted through the arm 96 and the sleeve 102 to the arm 104, and causes said arm to be shifted, against the force of the spring 100, in a counter-clockwise direction, so that the surface 106 on the arm 104 engages the stud 108 on the link 110, to shift said stud downwardly.

At this time in the cycle of accounting machine operation, the row 1 total plate (not shown) is maintained in fixed position by an alining device (not shown), as described in the previously-mentioned United States Patents Nos. 1,619,796 and 2,373,510. Since the arm 123 is connected to the row 1 total plate by the link 125, and since the arm 122 is rigidly connected to the arm 123 for unitary movement by means of the sleeve 121, the arm 122 is also held against movement at this time.

It will therefore be seen that, as the arm 104 is moved counter-clockwise and engages the stud 108 on the link 110, the stud 120 of the arm 122, in cooperation with the slot or raceway 116 in the link 110, is effective to cam said link to the right, as viewed to FIG. 1, thereby rocking the arm 112 and the segment 30 counter-clockwise. This movement applied to the segment 30 is effective, through the gear 26, to move the type wheel 20 one additional position, so that the type face 24 of the type wheel 20 which prints a triangle symbol is moved into position on the print line, instead of the type face which prints an asterisk symbol.

The impression hammer 22 is then operated, so that the desired symbol, in this case a triangle, is printed on the ledger card 21 at the same time as the new balance is printed.

On the other hand, if the balance pickup operation preceding the new balance operation has been an automatic pickup operation, a full sensing movement of the pawl arm 52 is prevented, as previously described, and the link 92 is not shifted into a position in which the stud 130 thereon will be engaged by the surface 132 on the arm 134, to move said link downwardly. As a consequence, no shifting of the link 110 takes place, and the type wheel 20 remains in the position shown in FIG. 1, in which the type face 24 bearing an asterisk symbol is located in printing position. Therefore, in this case, when the impression hammer 22 is operated, the asterisk symbol 23 is printed on the ledger card 21 with the new balance.

From approximately 280 degrees to 316 degrees of a new balance cycle of accounting machine operation, the cams 144 and 146 shift the cam arms 136 and 138 clockwise. The arm 134, being fixed for unitary movement with the arms 136 and 138, is also rocked clockwise, so that the surface 132 is moved upwardly to permit the stud 130 and the link 92 to return, if they have been shifted, to the position in which they are shown in FIG. 1, under the influence of the spring 100. This movement is effective to shift the arm 104 clockwise, so that the link 110 is permitted to return, under the influence of the spring 126, to the position in which it is shown in FIG. 1, thereby shifting the arm 112 and the segment 30 clockwise, so that the asterisk type face 24 of the type wheel 20 is shifted into printing position.

From approximately 330 degrees to 350 degrees of the new balance cycle of accounting machine operation, the cam 74 is effective to restore the pitman 73 to the position in which it is shown in FIG. 2, thereby also restoring the selecting pawl arm 52 and the arm 84 to their initial positions.

From approximately fifteen degrees to thirty degrees of the storage cycle of accounting machine operation which follows the new balance cycle of accounting machine operation, as fully described in the previously-mentioned United States Patent No. 2,947,475, the auxiliary cam shaft 63 rotates the cam 69 so that the periphery of said cam urges the roller 65 on the pitman 61 to the left, thereby rocking the plate 60 counter-clockwise to shift the retaining pawl 62 out of engagement with the recess 64 in the retaining plate 58. This enables the plate 58, the link 36, the element 40, and the print selection plate 48 all to be restored, under the influence of the spring 38, to the positions in which they are shown in FIG. 3.

From approximately 345 degrees to 360 degrees of the storage cycle of accounting machine operation, the pitman 61 is shifted to the right again under the influence of the spring 67 as the low portion of the cam 69 comes opposite the roller 65. The control plate 60 is thus shifted clockwise away from the retaining pawl 62, to permit said pawl to be rocked counter-clockwise by the spring 57 against the high portion of the selecting plate 58. All of the mechanism is thus restored to its initial position in preparation for the next pickup operation.

In summary, it will be seen that the mechanism described herein is effective to cause the printing of a first symbol, such as the asterisk 23 (FIG. 5), in association with the printing of a new balance, whenever the preceding pickup of an old balance has been an automatic machine operation; and is also effective to cause the printing of a second symbol, such as the triangle 25 (FIG. 5), in association with the printing of a new balance, whenever the previous pickup of an old balance has been a manual operation, carried out by the machine operator.

A study of FIG. 5 will show that no individual item entries, such as checks or deposits, are printed on the ledger card 21 between the last new balance entry bearing an asterisk thereafter, and the subsequent new balance entry bearing a triangle symbol thereafter. While check and deposit entries may be made following a manual pickup of old balance information, it is considered better practice to make a new balance operation immediately following a manual old balance pickup operation, in order that the new balance figure derived may be compared with the preceding new balance entry on the card, to insure that the manual old balance entry of information is correct. This latter new balance is also magnetically encoded on the magnetic stripes on the back of the ledger card. An automatic balance pickup operation may then be made and the individual check and deposit items posted, after which another new balance operation is made. When this new balance is printed, an asterisk symbol is also printed, since the preceding balance pickup was automatic.

In the case of an install operation of the accounting machine, in which information pertaining to an account is initially entered on the ledger card 21 by a manual operation, the setting of control row 1 is such that the type wheel 20 is positioned with the type face 24 having the triangle symbol 25 located on the print line. Accordingly, this symbol is printed in association with an "install" operation, thus indicating a manual pickup of information.

While the form of mechanism shown and described herein is admirably adapted to fulfill the objects primarily stated, it is to be understood that it is not intended to confine the invention to the one form or embodiment disclosed herein, for it is susceptible of embodiment in various other forms, within the scope of the appended claims.

What is claimed is:

1. In a machine of the class described, having printing means for printing at least two different symbols, the combination comprising switch means controlled by the initiation of a manual entry of information into the machine; solenoid means controlled by said switch means; first print selection means settable in response to energization of said solenoid means; retaining means to retain said first print selection means in set position; disabling means subsequently operable to disable said retaining means; second print selection means settable in a plurality of positions; first operating means for controlling the setting of said second print selection means; sensing means for sensing the settings of the first and second print selection means; setting means for setting the printing means to determine the symbol to be printed, and movable between a first position and a second position; cyclically operable means capable of actuating the setting means when said setting means is in its second position, and incapable of actuating the setting means when said setting means is in its first position; and second operating means controlled by the sensing means for selectively shifting the setting means from said first position to said second position in response to a given setting of the first and second print selection means, thereby controlling the setting of the printing means to cause a predetermined symbol to be printed in accordance with the settings of the first and second print selection means.

2. In a machine of the class described, having printing means for printing at least two different symbols, the combination comprising switch means controlled by the initiation of a manual entry of information into the machine; solenoid means controlled by said switch means; first print selection means settable in response to energization of said solenoid means; second print selection means settable in a plurality of positions; first operating means for controlling the setting of said second print selection means; sensing means for sensing the settings of the first and second print selection means; setting means for setting the printing means to determine the symbol to be printed, and movable between a first position and a second position; cyclically operable means capable of actuating the setting means when said setting means is in its second position, and incapable of actuating the setting means when said setting means is in its first position; and second operating means controlled by the sensing means for selectively positioning the setting means in either said first position or said second position, according to the settings of the first and second print selection means, thereby controlling the setting of the printing means to determine the symbol to be printed in accordance with the settings of the first and second print selection means.

References Cited in the file of this patent
UNITED STATES PATENTS

| | | |
|---|---|---|
| 1,065,792 | Ellis | June 24, 1913 |
| 1,294,704 | Reirdon | Feb. 18, 1919 |
| 1,445,490 | Coffee | Feb. 13, 1923 |
| 2,281,742 | Bradt | May 5, 1942 |
| 2,350,454 | Goebel | June 6, 1944 |
| 2,647,688 | Christian et al. | Aug. 4, 1953 |
| 2,954,922 | Chall | Oct. 4, 1960 |
| 3,060,846 | Sommer et al. | Oct. 30, 1962 |